United States Patent [19]

Gelardi et al.

[11] Patent Number: 5,158,244

[45] Date of Patent: * Oct. 27, 1992

[54] VIDEO CASSETTE DUST DOOR LATCH

[75] Inventors: Anthony Gelardi, Cape Porpoise; Craig Lovecky, Old Orchard Beach; Robert Barstow, Alfred, all of Me.; Alan Lowry, Canton, Mass.; Richard Rolfe, Biddeford, Me.

[73] Assignee: Shape Inc., Biddeford, Me.

[ * ] Notice: The portion of the term of this patent subsequent to Jun. 25, 2008 has been disclaimed.

[21] Appl. No.: 562,004

[22] Filed: Aug. 1, 1990

Related U.S. Application Data

[63] Continuation-in-part of Ser. No. 389,401, Aug. 4, 1989, Pat. No. 5,026,000.

[51] Int. Cl.$^5$ ............................................. G11B 23/04
[52] U.S. Cl. .................................................. 242/199
[58] Field of Search ........................ 242/197–200; 360/132

[56] References Cited

U.S. PATENT DOCUMENTS

| 3,900,172 | 8/1975 | Kamaya | 242/198 |
|---|---|---|---|
| 4,884,158 | 11/1989 | Pertzsch et al. | 360/132 |
| 4,915,322 | 4/1990 | Schoettle et al. | 242/198 |
| 4,930,821 | 6/1990 | Jang | 242/200 X |
| 5,026,000 | 6/1991 | Gelardi et al. | 242/199 |

FOREIGN PATENT DOCUMENTS

| 88438 | 9/1983 | European Pat. Off. . |
|---|---|---|
| 179169 | 5/1986 | European Pat. Off. . |
| 189989 | 8/1986 | European Pat. Off. . |
| 1416588 | 12/1975 | United Kingdom . |
| 2227478 | 8/1990 | United Kingdom . |

OTHER PUBLICATIONS

Feinwerktechnik & Messtechnik 93, Aug.–Sep. (1985), No. 6, Munchen, Deutschlad, "Die Automatische Montage von Video-Cassetten", Von Heinrich et al.

Primary Examiner—Daniel P. Stodola
Assistant Examiner—William G. Battista, Jr.
Attorney, Agent, or Firm—Staas & Halsey

[57] ABSTRACT

Integrally molded dust door latches for a video cassette. The latch never needs to be preloaded and includes a planar latch body having a flexing member formed integrally therein to impart inherent spring action to the latch. The latch includes two lateral supports and a first and second projections which enter openings formed in the cassette base. The latch is assembled in the cassette such that the latch can flex or deflect via the flexing member when pressure is applied to one of the projections.

12 Claims, 7 Drawing Sheets

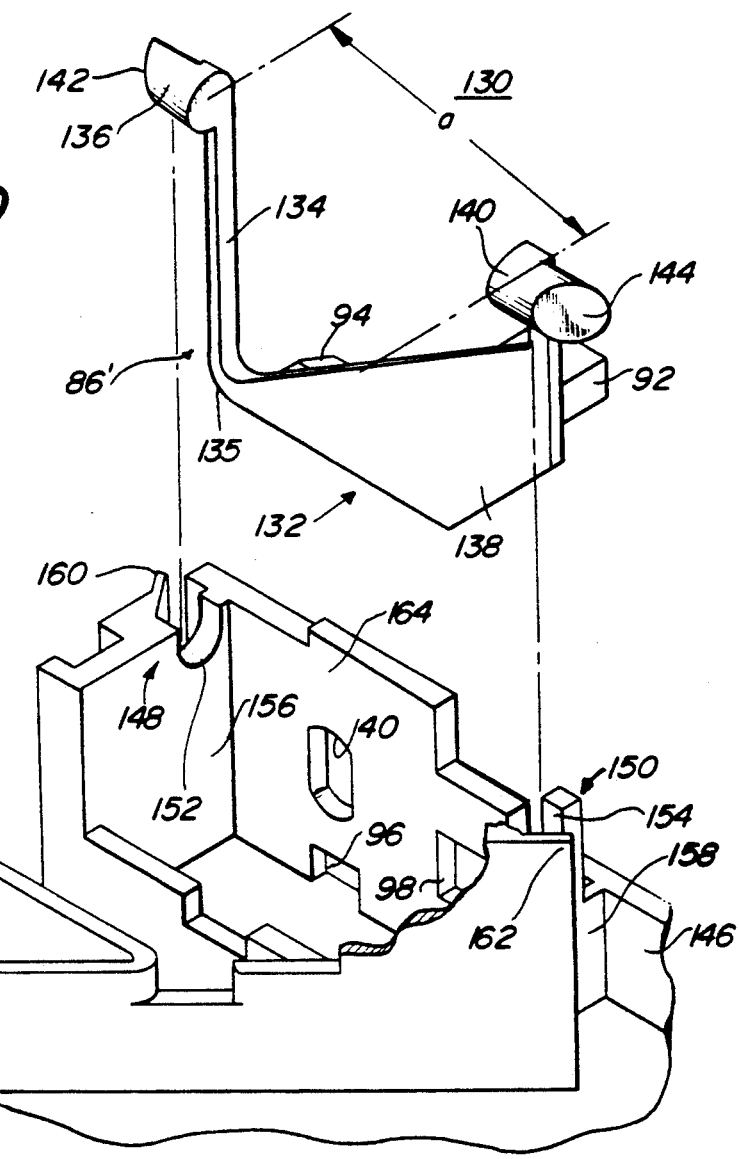
FIG. 10
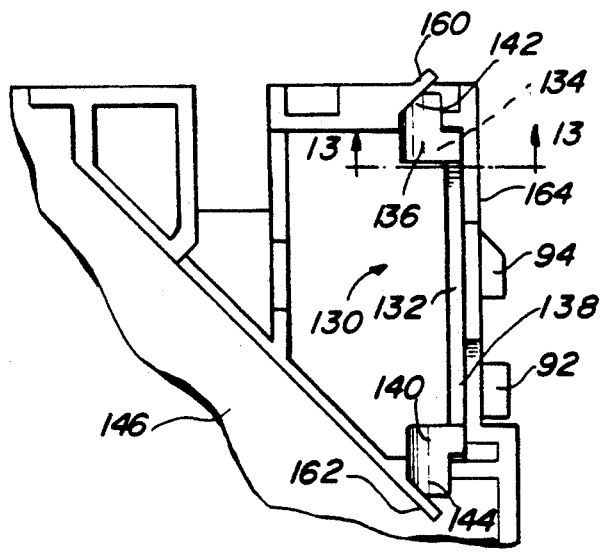
FIG. 11
FIG. 13

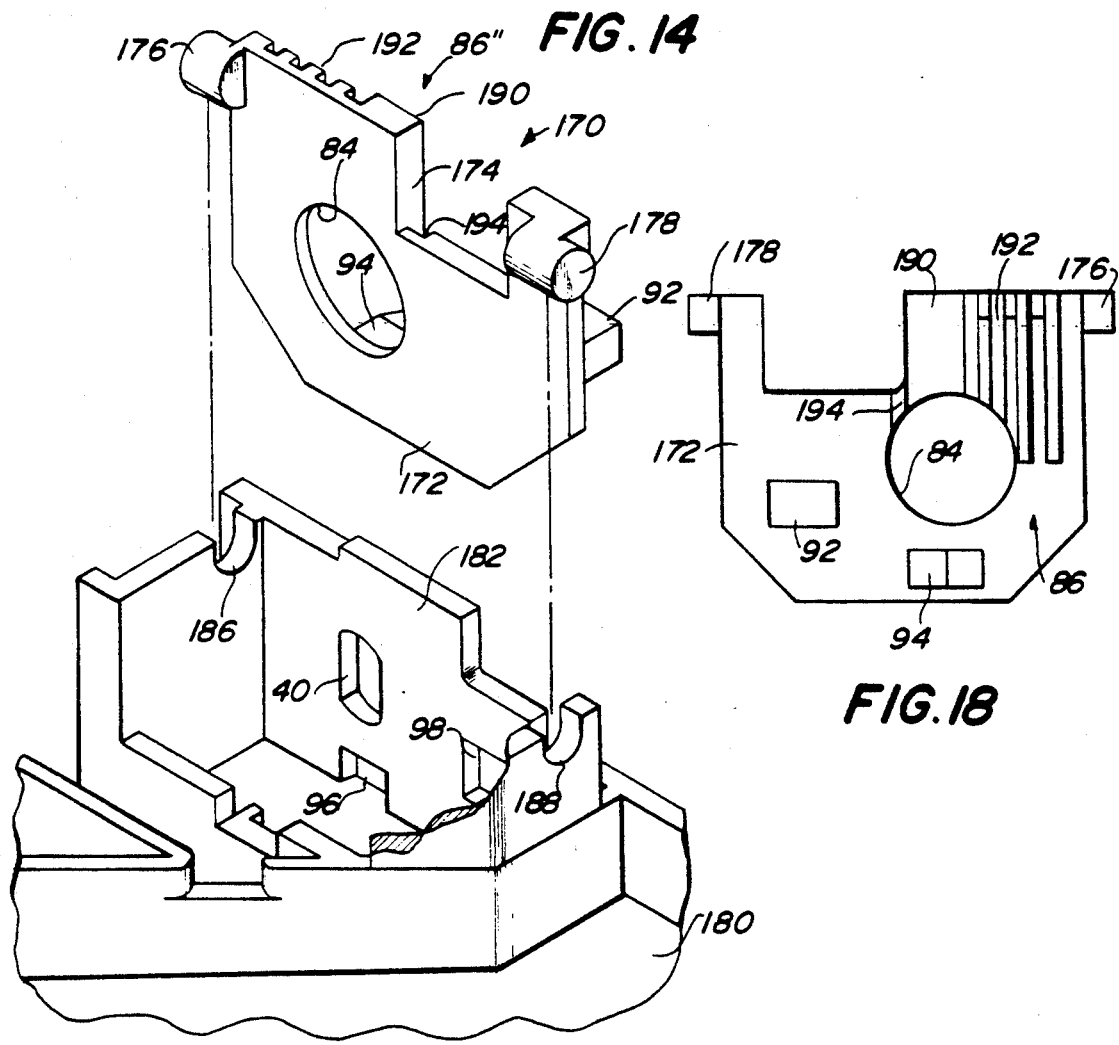
FIG. 14
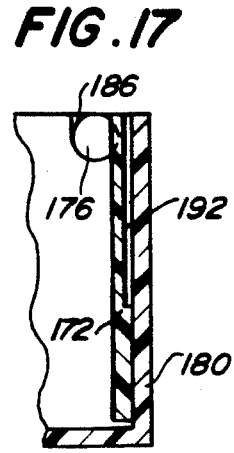
FIG. 18
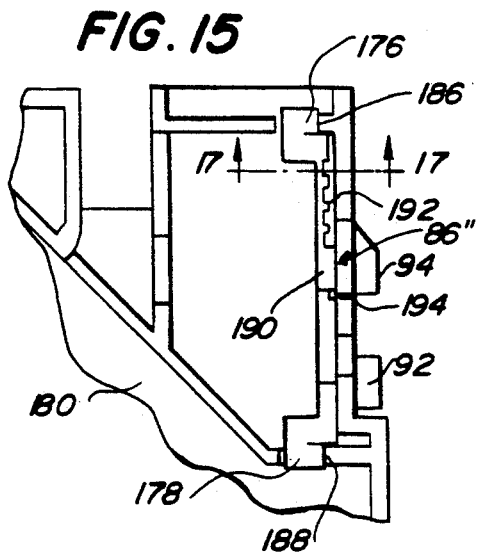
FIG. 15
FIG. 17

VIDEO CASSETTE DUST DOOR LATCH

This application is a continuation-in-part of U.S. patent application Ser. No. 389,401, filed Aug. 4, 1989, entitled "VIDEO CASSETTE INTEGRAL DUST DOOR LATCH/SPRING," on behalf of the common inventors, Anthony L. Gelardi, and Craig Lovecky, now U.S. Pat. No. 5,026,000.

BACKGROUND OF THE INVENTION

This invention relates to a tape cassette and, more particularly, to a video cassette dust door latch having inherent spring action.

For convenience of reference, when describing the tape cassette of the prior art and the present invention, "inward" means in a direction toward to the interior of the cassette from its sides, "outward" means in a direction toward the sides of the cassette from the interior, "upward" means in a direction toward the cassette cover from the cassette base, and "downward" means in a direction toward the base from the cover.

A conventional tape cassette usually has a flat, substantially rectangular, configuration which may be formed of a suitable plastic, and includes a cassette cover and base, each having side walls. Tape reels are usually located in side-by-side relation within the cassette so as to be freely rotatable, and magnetic tape is wound between the tape reels.

Such cassettes also usually include a hinged dust door and a biased latch for temporarily locking the dust door closed. The dust door protects the tape in the cassette from dust, abrasion, etc., when the cassette is not being used in a tape player/recorder, e.g., during transport and storage.

Conventionally, the latch has been made in the form of a substantially flat, rectangular latch body, pivotably supported by lateral pivot pins which rest in the cassette base. The latch body is urged outwardly by a spring attached to the latch body and abutting a wall of the cassette. First and second projections on the outward side surface of the latch body extend through corresponding openings formed in the side wall of the cassette base. The first projection engages an opening in the side of the dust door when the door is in a closed position, thereby locking the door. The second projection is exposed on the outside of the tape cassette, adjacent one end of the dust door, to allow access by a movable pin on the tape player/recorder when the tape cassette is inserted into the tape player/recorder. The second projection is automatically depressed by the pin, the latch pivots against the force of the spring, releasing the first projection is released from engagement with the dust door, and the dust door is allowed to open to expose the tape to the tape player/recorder.

One type of spring conventionally used to bias the latch is a separate, coil spring connected to a boss formed to extend from the latch body, as described in Assignee's U.S. Pat. No. 4,475,700. The drawbacks associated with this type of latch/spring assembly are the cost associated with manufacturing and assembling multiple parts and the difficulty of handling, attaching and preloading the coil spring. The present invention is not directed to this type of separate spring, but is directed to a type wherein the latch is characterized by inherent spring action.

A dust door latch having a spring integrally formed therewith has been proposed. More particularly, as described in U.S. Pat. No. 4,323,207, issued to Gebeke, the latch includes an integral spring in the form of a "U" or "S"-shape extending from a rigid body portion slidably mounted in a housing of the cassette body. However, this structure is sensitive to precise molding and how it is located in the cassette. For example, the spring extension must be carefully preloaded or it could be dislodged and not operate. This latch design is also vulnerable to storing and shipping damage.

Further, U.S. Pat. No. 4,466,583, issued to Giannis et al., discloses, as shown in FIG. 1 herein, a dust door latch generally designated by element 10. The latch 10 is mounted for rotational movement about a substantially horizontal axis "a" between a latching position at which the latch 10 locks the dust door (not shown) in its closed position, and an unlatching position in which the dust door is unlatched for opening. The rotational movement is provided by a pair of well-known, cylindrical pivot pins 12 and 14. Pivot pin 12 rests in a rounded notch 16 in a forward wall 18 of the cassette base 20. The other pivot pin 14 rests in another rounded notch 22 on the top of an interior wall 24 which extends upwardly from the bottom wall 26 of the cassette base 20. The usual operable projections described above (not shown) extend outwardly from the latch 10 through openings (one shown at 36) formed in the cassette base 20 side wall 38. The cassette base also includes a conventional light hole 40. An elongated resilient arm 28 is formed on the latch 10 to extend downwardly or upwardly toward the interior of the cassette base 20 and in the direction of rotation of the latch 10 toward its unlatched position. Arm 28 is attached at one end 30 to the latch 10 in an integral, one-piece relationship. The opposite end 32 of arm 28 must be pre-loaded, i.e., biased against an inner wall 34 of the cassette base 20 for normally urging the latch 10 toward its latching position.

The drawbacks associated with this conventional, integral dust door latch/spring 10 are that: (a) it is costly to produce since the arm 28 must be carefully molded to ensure proper installation and retention of its biasing ability over time and under different temperature conditions; (b) assembly of this small part is difficult due to the need to bend the arm 28 toward the latch 10 during assembly to prevent obstruction with the wall 34 and to properly preload the spring 28 in the cassette base 20 against the wall 34; (c) the pivot pins 12, 14 must be accurately molded and received by the notches 16, 22 or else the latch 10 will not pivot as required, and the dust door will not open; (d) the mold for forming the latch 10 must be able to accurately form the spring arm 28 to extend from a central planar portion; and (e) the mold to form the cassette base must be able to form the separate wall 34 to allow preloading of the spring arm 28.

Further, as with any mass-produced, consumer item such as video cassettes, there is always a desire to eliminate parts and assembly steps to decrease overall cost.

Although the prior art described above eliminates some of the problems inherent in the tape cassette door latch art, the prior art still does not teach a biased door latch capable of the most cost efficient production nor the most time efficient automated assembly, nor does it ever have to be preloaded.

SUMMARY OF THE INVENTION

Accordingly, it is a purpose of the present invention to provide a tape cassette which can be made for less cost than conventional tape cassettes.

It is another purpose of the present invention to provide an integral dust door latch/spring for a video cassette which is capable of more cost-efficient production than the prior art.

It is another purpose of the present invention to provide an integral dust door latch/spring capable of being automatically assembled into a cassette by a quick and easy method.

It is another purpose of the present invention to provide an integral dust door latch/spring in which the spring is integrally molded as part of the latch body, but does not extend therefrom.

It is another purpose of the present invention to provide an integral dust door latch that does not have to be preloaded during assembly, nor does it ever have to be preloaded.

Finally, it is a purpose of the present invention to provide a method for facilitating assembly of a dust door latch into a tape cassette.

To achieve the foregoing and other purposes of the invention, and in accordance with the purposes of the invention, there is provided both improved, one piece dust door latches for a video cassette, each having inherent spring action, and methods for assembling same into the video cassette.

The first embodiment of the device includes: a normally planar, elongated latch body having a first upper end, a second lower end and a relatively thin horizontal portion or "flexing means" formed about midway longitudinally therebetween. The first end includes two lateral, flat sided supports and a projecting, substantially planar, perpendicular member on one side.

During operation, a pin of the tape player/recorder presses inwardly and upwardly against the conventional, exposed projection. Since the first and second ends are separated by the flexing means, and since the first end is effectively non-movable, the second end deflects or flexes inwardly relative to the first end under the pressure. As a result, the second projection leaves engagement with a corresponding receptacle formed on the dust door, allowing the dust door to bias open, whereby the tape player/recorder can gain access to the tape. When operation of the tape ends, the tape player/recorder releases pressure on the conventional projection and the second end flexes back to its original position relative to the first end under the biasing influence of the flexing means, and the second projection locks the dust door.

In the second embodiment of the device, the lateral supports include angled free ends which abut corresponding angled walls in the cassette base. The latch body includes a thin portion or leg extending from one of the lateral supports and another, thicker portion or leg between the thin portion and the other lateral support. When the pin pushes the conventional projection, the lateral supports are prevented from rotating freely and the pivot pins are forced to move toward each other, creating a biasing force in the latch, which causes the latch to want to return to its original shape.

In the third embodiment, the upper portion of a planar, substantially rectangular latch includes lateral supports and a substantially central, projecting, abutting member surrounded by a plurality of ribs. When the conventional projection is pushed, the abutting member abuts the adjacent exterior wall of the cassette, and the latch flexes at the thinned portions, thereby biasing the latch. The latch returns to its original position when pressure is removed from the conventional projection.

The method includes the steps of: (1) locating the first and second projections in the openings formed in the cassette base; (2) locating the lateral supports in receptacles formed in the base; and (3) placing a cassette cover onto the base so that the one area of the latch is able to flex relative to another area via the flexing member.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is an exploded view illustrating the latch and cassette base according to a second embodiment of the present invention;

FIG. 11 is a top view illustrating the latch of the second embodiment assembled in the cassette in the locked position;

FIG. 13 is a side, cross-sectional view taken along line 13—13 of FIG. 11;

FIG. 14 is an exploded view illustrating the latch and cassette base according to a third embodiment;

FIG. 15 is a top view illustrating the latch of the third embodiment assembled in the cassette in the locked position;

FIG. 17 is a side, cross-sectional view taken along line 17—17 of FIG. 15; and

FIG. 18 is a front view illustrating the latch of the third embodiment.

DETAILED DESCRIPTION OF THE PREFERRED EMBODIMENTS

Figure 1:
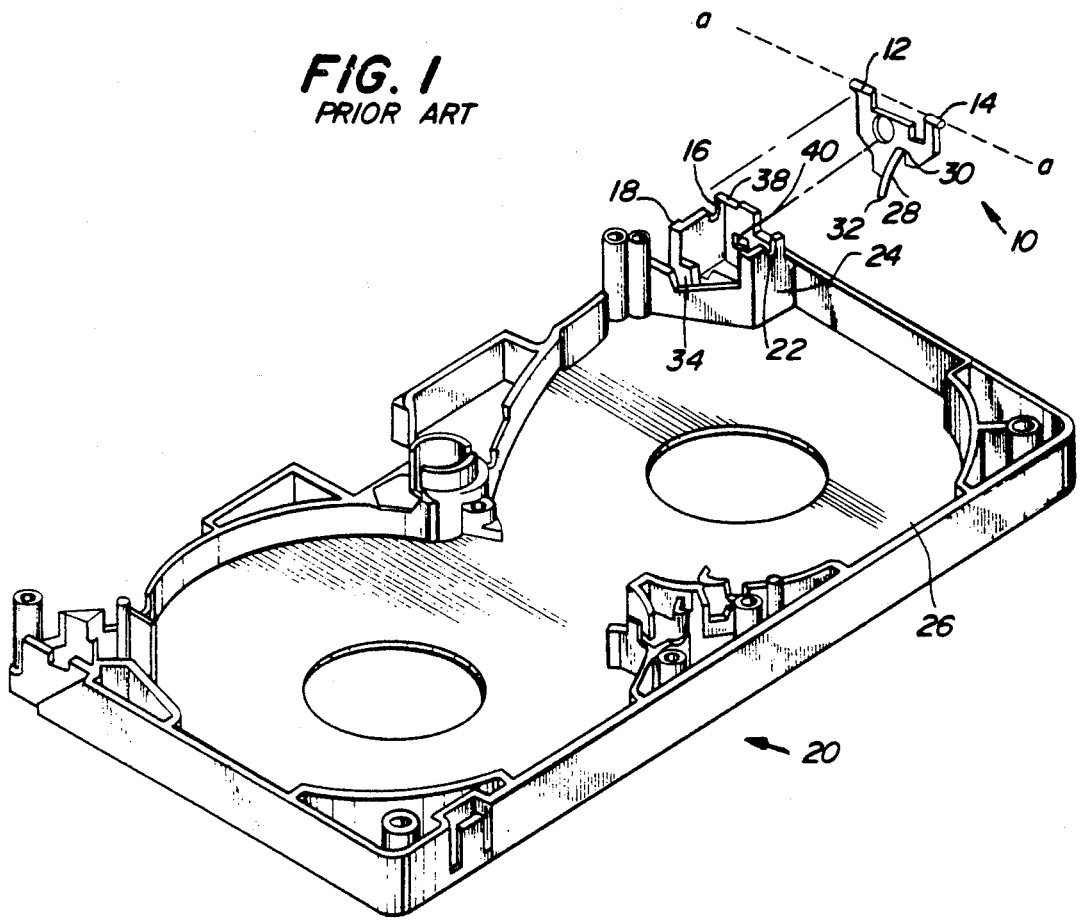
FIG. 1 is a perspective, exploded view illustrating a conventional dust door latch and a cassette base.

The preferred embodiments according to the present invention will now be described with reference to FIGS. 1-18. In each embodiment, the latch is inserted into the cassette base and no pre-loading is ever required. At least one portion of the latch is kept stationary or its movement is interfered with, causing another portion of the latch, pushed by a pin of a tape player/recorder against a conventional projection on the latch, to flex enough to store kinetic energy. The flexing is made possible by a flexing means incorporated directly in the latch body. When the pin is removed, the latch flexes back to its original position.

The first embodiment of the device of the present invention, shown in FIGS. 1-9, basically includes a dust door latch designated generally by reference number 80, which is received between a cassette cover 50 and cassette base 52. The latch 80 is a one piece, preferably injection molded part, shot in a resilient material such as nylon or acetal. Nylon appears to exhibit better properties for this invention than acetal. That is, the latch 80 fabricated from nylon deflects or flexes better at the very sensitive gram forces applicable.

The latch 80 includes a planar body 82 having a rectangular recess 83 for allowing access to a pivot pin (not shown) of the dust door 68 and a conventional circular light hole 84. The body 82 also includes a flexing means 86 in the form of a relatively thin horizontal portion 87 formed between a first, upper end 90 and a second, lower end 88 of the latch body 82. This flexing means 86 is the "spring" for this dust door latch 80.

The second end 88 includes two projections 92, 94 which enter corresponding openings discussed below, one 92 exposed and the other 94 further looking the dust door 68 via a receptacle 69 (FIG. 8) formed in the dust door 68.

As known, heat and cold cause deflection forces of plastic to differ. As a result, the temperature condition of the cassette 48 when inserted into a tape player/recorder, may affect the ability of a pin 120 of the tape player/recorder to push the projection 92. As a result, chamfers or radii 95, 97 are added to the projection 92 as part of the present invention to help the tape player/recorder pin 120, which may also have a chamfered or radiused surface, locate properly and overcome retraction forces.

The first end 90 includes two lateral supports 100, 102 and a projecting substantially planar, perpendicular member 104. Extending across the angle between the latch body 82 and the perpendicular member 104 is a gusset 106 which adds stiffness therebetween. Further, a generally triangular shaped protuberance 108 projects from a free end 110 of the perpendicular member 104 in a direction away from the second end 88 of the body 82 and perpendicular to the body 82. Finally, a square shaped recess 122 is formed adjacent the triangular protuberance 108.

Figure 5:
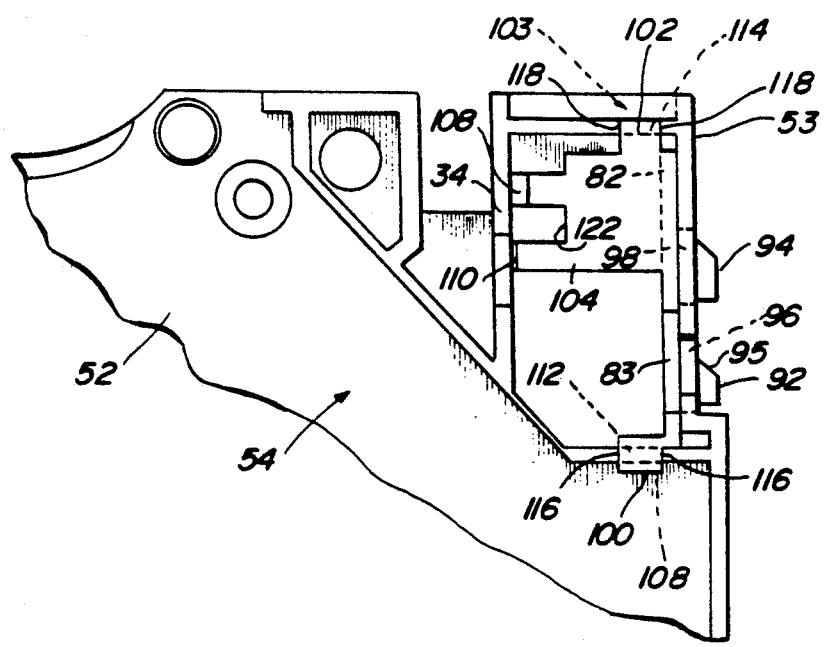
FIG. 5 is a plan view illustrating an area of the tape cassette base which receives the latch according to the first embodiment of the present invention.

FIG. 5 is a plan view of an area 54 of the base 52 which cooperates with an area 56 of the cover 50 (shown in FIG. 6) for receiving the latch 80. The area 54 includes a side wall 53 having an opening 55 (FIG. 7) which allows light to pass through the tape cassette 48 during use, as is well known in the art. The side wall 53 also includes openings 96 and 98 for receiving the projections 92 and 94, respectively. Receptacles 101, 103 are also formed in the base 52 to receive the supports 100, 102.

A benefit of the present invention is that the conventional cassette base structure does not necessarily have to be modified to receive the latch 80 of the invention. However, if desired, the conventional interior wall 34 can be eliminated, since there is no separate spring arm which must be pre-loaded against wall 34 in order to operate. Of course, eliminating wall 34 would simplify the cassette base 52 mold and would result in a savings of raw materials.

Figure 6:
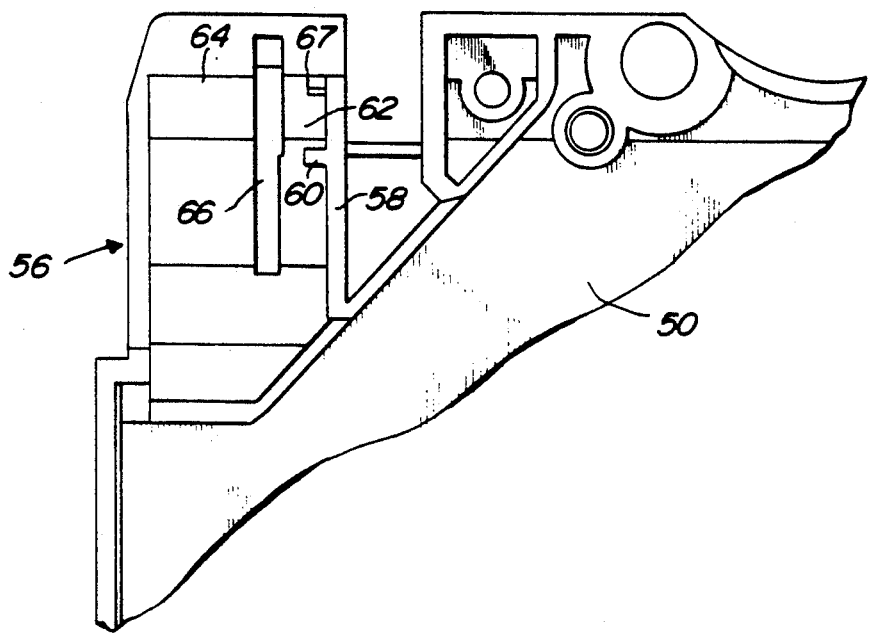
FIG. 6 is a plan view illustrating an area of the tape cassette cover which receives the latch according to the first embodiment of the present invention.
Figure 7:
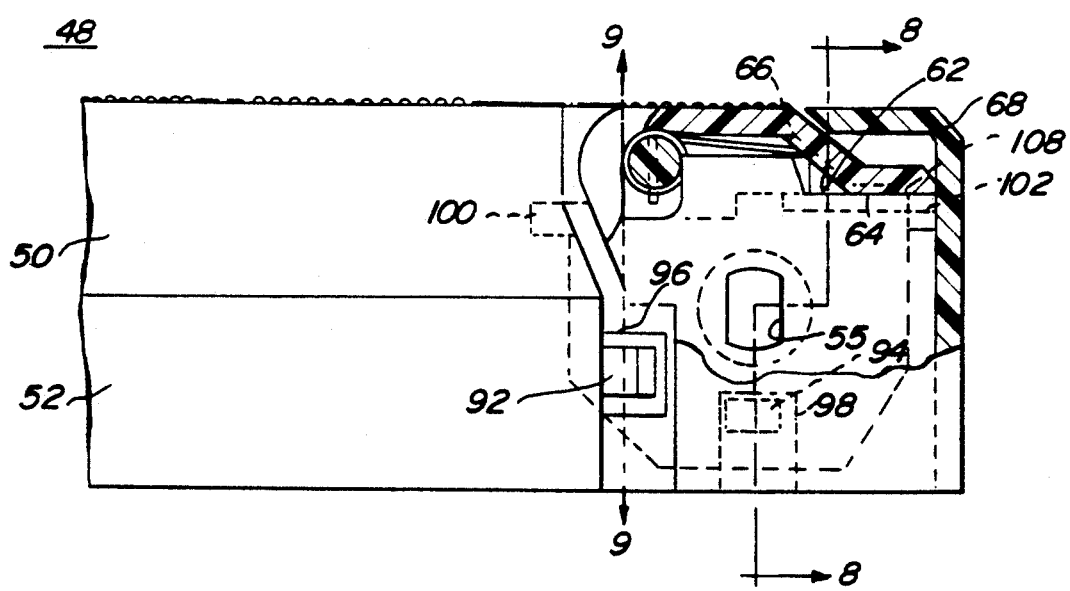
FIG. 7 is a partial cross sectional side view illustrating the latch assembled in the cassette in the locked position.

Referring to FIG. 6, the area 56 includes a first wall 58, a vertical linear projection 60 and a recess 62 formed between the projection 60 and a small projecting member 63. The recess 62 is inclined as can be seen in FIG. 7. The area 56 also includes an abutting portion 64, and an indentation 66 which receives a leg of the conventional coil spring 70 of the dust door 68.

As shown in FIG. 7 the latch 80 is assembled in the cassette 48 by the following method, the steps of which do not necessarily have to be followed in the order described. The latch 80 is inserted downward so that the projections 92, 94 enter the openings 96, 98, respectively, formed in the cassette base 52. Then, the supports 100, 102 are located in the receptacles 101, 103 formed in the base 52.

Figure 2:
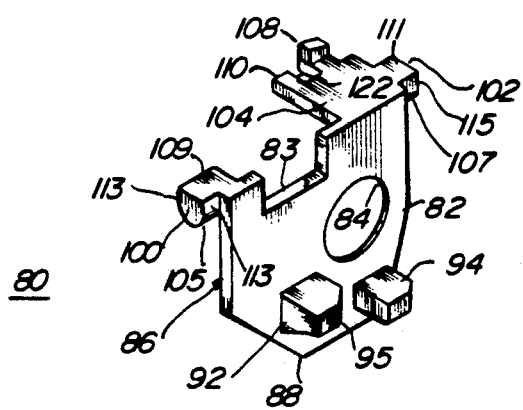
FIG. 2 is a perspective view illustrating the latch according to a first embodiment of the present invention.
Figure 3:
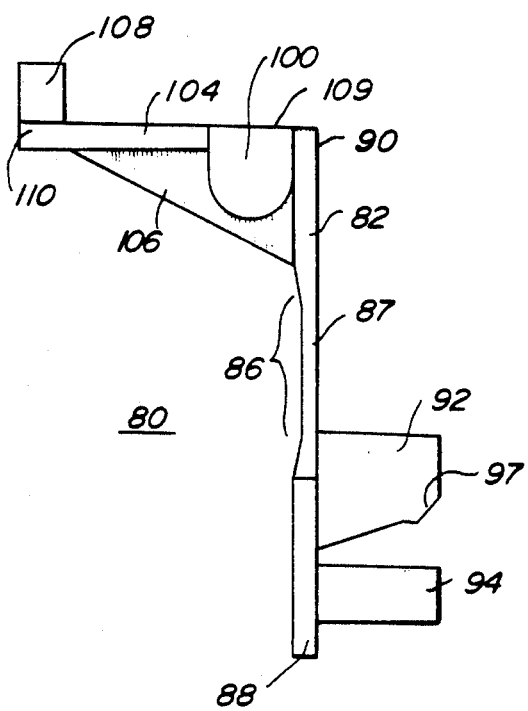
FIG. 3 is a side view illustrating the latch shown in FIG. 2.
Figure 4:
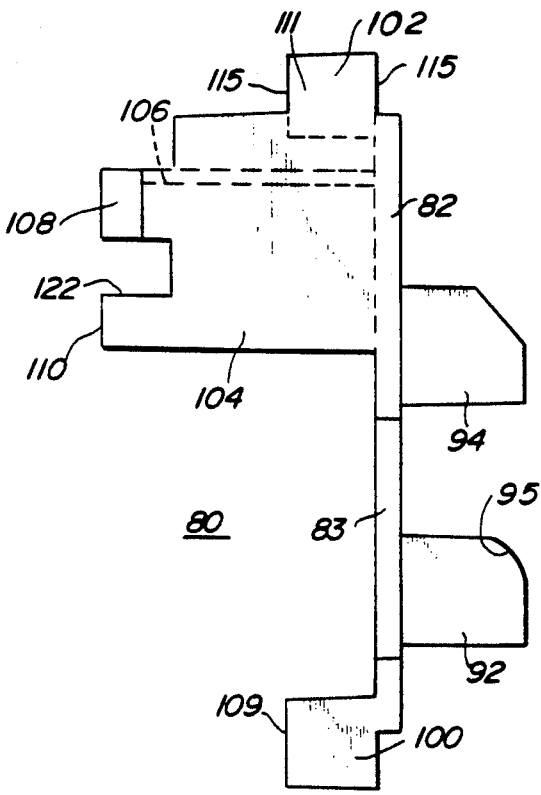
FIG. 4 is a top view illustrating the latch shown in FIG. 2.

As can be seen, the round pivot pins 12, 14 of prior art of FIG. 1 are not used. Instead, the lateral supports 100, 102 are used, each of which includes a rounded base 105, 107 only, a flat top 109, 111, and flat sides 113, 115, respectively (FIGS. 2-4). Each receptacle 101, 103 includes a corresponding, rounded base 112, 114 and flat sides 116, 118 (FIG. 5).

The lateral supports 100, 102 are easy to load due to the rounded bases 105, 107 facilitating automated insertion into the receptacles 101, 103. However, the abutting relationship of the flat sides 113, 115 of the supports 100, 102 and the flat sides 116, 118 of the receptacles 101, 103 assist in preventing the first end 90 of the latch 80 from pivoting relative to the cassette base 52.

Figure 8:
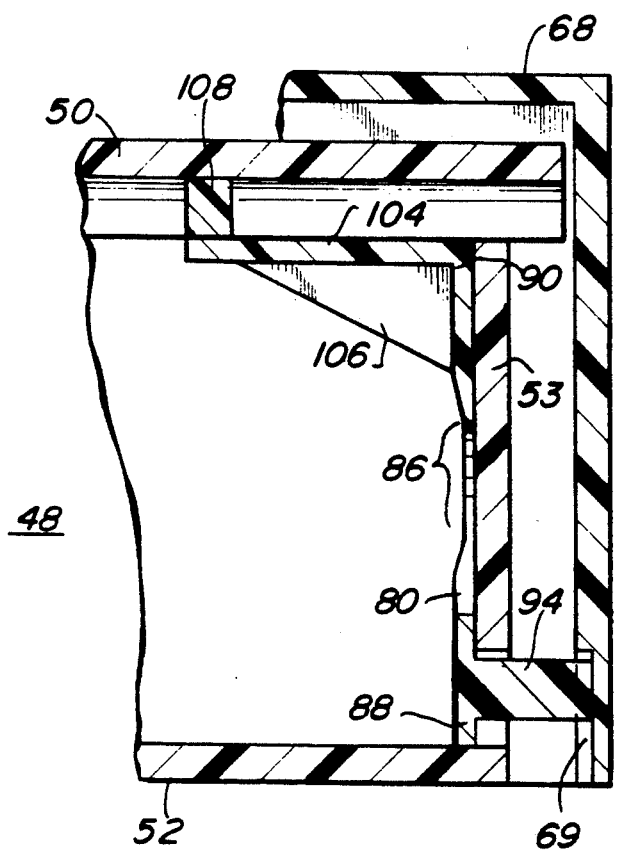
FIG. 8 is a side, cross-sectional view taken along line 8—8 of FIG. 7.

The cassette cover 50 is then located on the base 52 so that: the linear, vertical projection 60 formed on the cover 50 enters the square shaped recess 122 of the body 82; the adjacent triangular shaped protuberance 108 of the latch 80 mates with the corresponding recess 62 on the cover 50; and the planar perpendicular member 104 of the latch 80 abuts the abutting portion 64 of the cover 50. FIG. 8 is a side view of the latch 80 assembled in the tape cassette 48 in the "locked" (vertical planar) position.

The receipt of the lateral supports 100, 102 in the receptacles 101, 103, and the cooperation of the perpendicular member 104 and the cover's area 56 described above, serve, in direct contrast to the conventional latch 10, to fix substantially the first end 90 of the latch 80 in the cassette 48. By "substantially" it is meant that for all intents and purposes the first end 90 of the body 82 does not move, but some minor shift or movement of course will occur due to assembly tolerances.

The above description indicates that it is a cooperation between the base 52 and cover 50 which fixes the first end 90 of the latch 80. Of course, as would be understood by one of ordinary skill, there are alternate ways to fix the first end 90 relative to the cassette 48 without using both the base 52 and cover 50. The main consideration is fixing the first end 90 so that the second end 88 can flex relative thereto.

Figure 9:
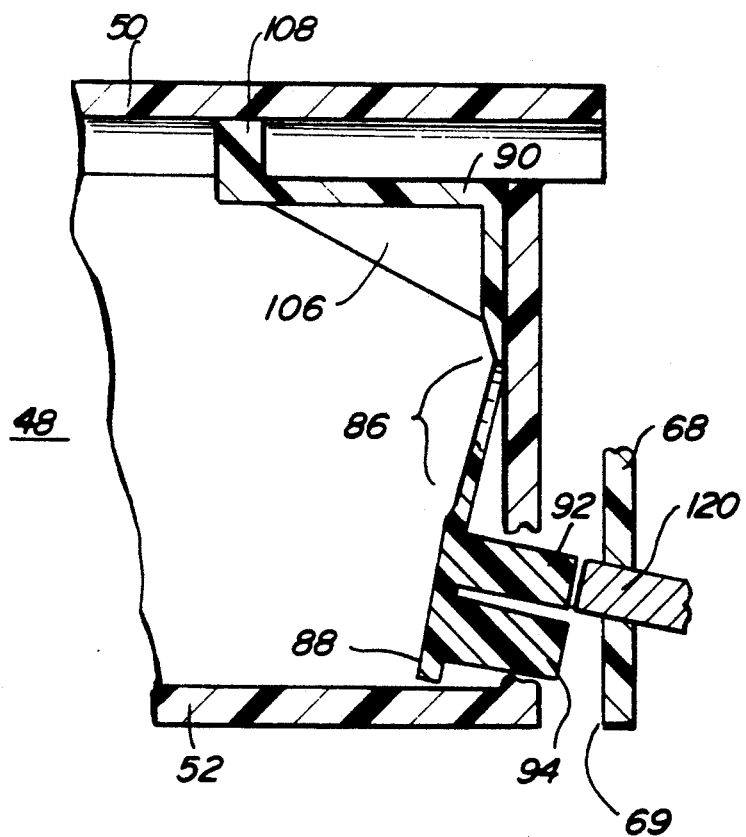
FIG. 9 is a partial, cross sectional, side view illustrating the latch in the "unlocked" position.

As shown in FIG. 9, during operation the pin 120 of the tape player/recorder presses inward against the exposed projection 92, as known in the art. Since the first end 90 and second end 88 of the latch 80 are separated by the flexing means 86, and since the first end 90 is effectively fixed between the base 52 and cover 50, the second end 88 flexes or deflects inwardly relative to the first end 90 under pressure. It is only at this time that any spring loading of the latch occurs. As a result, the second projection 94, leaves engagement with the corresponding receptacle 69 on the dust door 68, allowing the dust door 68 to bias open via the spring 70, whereby the tape player/recorder can gain access to the tape. When operation of the tape ends, the tape player/recorder pin 120 releases pressure on the projection 92 and the second end 88 flexes back to its original position co-planar with the first end 90 under the biasing influence of the flexing means 86.

FIGS. 10–13 illustrate the integrally molded latch 130 according to a second embodiment of the present invention. The latch 130 is a one piece, preferably injection molded part, also shot in nylon or acetal.

The latch 130 includes a planar body 132 including a flexing means 86' in the form of a thin portion 134 extending downward from a first lateral support 136 and a thicker portion 138 extending between the bottom of the thin portion 134, i.e. elbow 135, and a second lateral support 140. Each lateral support 136, 140, includes an angled free end 142, 144, respectively. The shape of the body 132 not only allows the body to flex, but allows access to the pivot pin of the dust door 68 and allows passage of a light beam.

The cassette base 146 includes two receptacles 148, 150 for receiving the lateral supports 136, 140. Each receptacle includes a U-shaped opening 152, 154, formed in walls 156, 158, and an angled wall 160, 162, respectively. The flexing means 86' formed in the substantially planar body 132 is the "spring" for this dust door latch 130.

The latch 130 also includes the two conventional projections 92, 94. The exterior wall 164 includes openings 96 and 98 for receiving the projections 92, 94, respectively, as well as a light hole 40.

As shown in FIG. 10 the latch 130 is assembled in the cassette base 146 by the following method: the latch 130 is inserted downward so that the projections 92, 94 enter the openings 96, 98, respectively, formed in the cassette base 146; and the pivot pins 136, 140 are located in the receptacles 148, 150 formed in the base 146. When assembled, there is a distance "a" between the inside of the lateral supports 136, 140.

As can be seen, the totally rotatable pivot pins 12, 14 of prior art of FIG. 1 are not used. Instead, the lateral supports 136, 140 with angled free ends 142, 144 are used. The lateral supports 136, 140 are easy to load due to the rounded shape facilitating automated insertion into the receptacles 148, 150. However, the abutting relationship of the angled free ends 142, 144 of the lateral supports 136, 140 and the angled walls 160, 162 of the receptacles 148, 150 assist in substantially preventing the lateral supports 136, 140 from freely pivoting relative to the cassette base 146.

FIGS. 11 and 13 are top and side, cross sectional views, respectively, of the latch 130 assembled in the tape cassette in the "locked" position.

Figure 12:
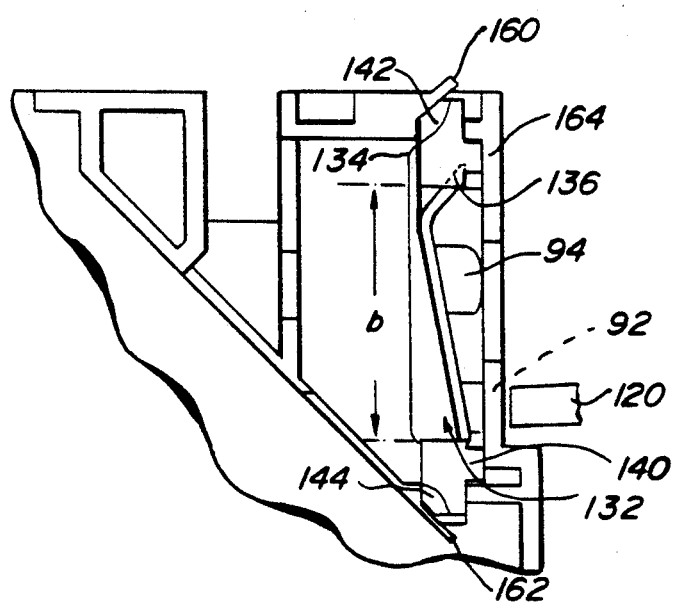
FIG. 12 is a top view illustrating the latch of the second embodiment assembled in the cassette in the unlocked position.
Figure 12A:
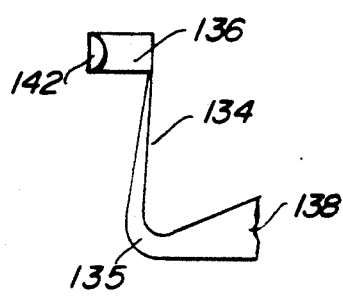
FIG. 12a is rear view of the leg 134 when the latch 130 is in the position shown in FIG. 11.
Figure 12B:
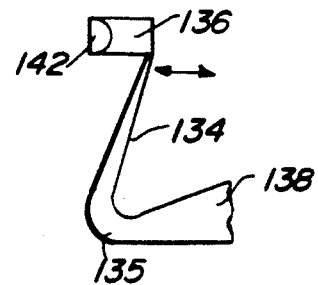
FIG. 12b is a rear view of the leg 134 when the latch 130 is in the position shown in FIG. 12.

As shown in FIG. 12, during operation the pin 120 of the tape player/recorder presses inward against the exposed projection 92, as known in the art. The lateral supports 136, 140 want to pivot. The cooperating angled free ends 142, 144 and angled walls 160, 162 cause the lateral supports 142 and 144 to partially ride along the walls, 160, 162, but pivoting is prevented. Instead, the lateral supports 136, 140 are forced toward each other under the pressure, as they abut the walls 160, 162, and the latch 130 is forced to flex or bow at the elbow 135 between portions or legs 134 and 138, thereby imparting kinetic energy to the plastic latch. During this "loading" of the latch, the leg 134 and leg 138 remain co-planar. However, the leg 134 moves toward leg 138 due to the flexible nature of the elbow 135. Compare FIGS. 12a and 12b. The distance between the insides of the lateral supports 136, 140 indicated by "b" in FIG. 12, is less than the distance "a" in FIG. 10. As a result, the second projection 94 leaves engagement with the corresponding receptacle 69 on the dust door 68, allowing the dust door 68 to bias open via the dust door spring (not shown), whereby the tape player/recorder can gain access to the tape.

When operation of the tape ends, the pin 120 releases pressure on the projection 92 and the lateral supports 136, 140 move back to their original positions under the biasing influence of the flexing means 86'.

FIG. 14–18 illustrate the integrally molded latch 170 according to a third embodiment of the present invention. This latch 170 is also one piece, injection molded part, shot in nylon or acetal.

The latch 170 includes a planar body 172 having a rectangular recess 174 for allowing access to the pivot pin of the dust door and a conventional circular light hole 84. The body 172 also includes a flexing means 86" formed centrally and transversely thereof. The flexing means 86" is in the form of a central transverse projection 190 located over the light hole 84, flanked by a plurality of ribs 192 on one side and a single rib 194 on the other side. The central projection 190 abuts the exterior wall 182 when the latch 170, when installed in the cassette base 180, and the ribs 192, 194 are spaced from the wall 182. This flexing means 86" is the "spring" for this dust door latch 170.

The latch 170 also includes the two conventional projections 92, 94, as well as two partially cylindrical, lateral supports 176, 178.

The cassette base 180 includes a exterior wall 182 having an opening 40 which allows light to pass through the tape cassette during use, as is well known in the art. The exterior wall 182 also includes openings 96 and 98 for receiving the projections 92 and 94, respectively. U-shaped receptacles 186, 188 are also formed in the base 180 to receive the supports 176, 178. A benefit of this embodiment is that the conventional cassette base structure does not need to be modified to receive the latch 170 of this embodiment.

As shown in FIG. 14, the latch 170 is assembled in the cassette base 180 by the following method: the latch 170 is inserted downward so that the projections 92, 94 enter the openings 96, 98, respectively, formed in the cassette base 180, and the supports 176, 178 are located in the receptacles 186, 188 formed in the base 180.

As can be seen, rounded lateral supports, like the pivot pins of the prior art of FIG. 1, are used in this embodiment. However, the flexing means 86" discussed below assists in preventing the lateral supports 176, 180 from pivoting freely relative to the cassette base 180.

FIGS. 15 and 17 are a top and a side, cross sectional view, respectively, of the latch 170 assembled in the tape cassette in the "locked" position.

Figure 16:
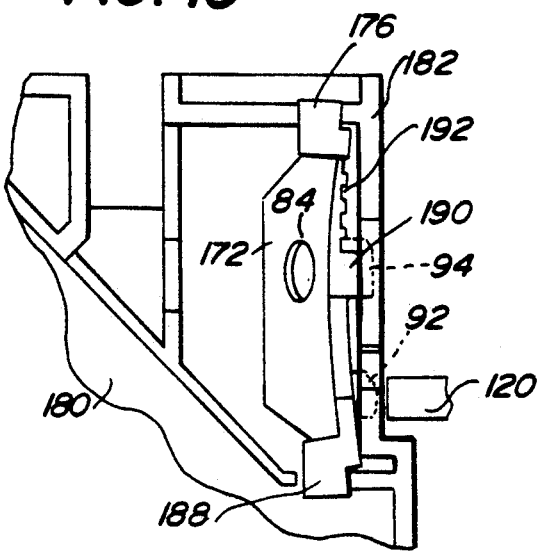
FIG. 16 is a top view illustrating the latch of the third embodiment assembled in the cassette in the unlocked position.

As shown in FIG. 16, during operation the pin 120 of the tape player/recorder presses inward against the exposed projection 92, as known in the art. As stated above, the central projection 190 of the flexing means 86" abuts the wall 182, and prevents free pivoting of the latch 170. Instead, the latch 170 bows via the ribs 192, 194 under the pressure, thereby building spring bias in the latch. As a result, the second projection 94 leaves engagement with the corresponding receptacle 69 on the dust door, allowing the dust door to bias open via a spring, whereby the tape player/recorder can gain access to the tape.

When operation of the tape ends, the pin 120 releases pressure on the projection 92 and the latch 170 flexes back to its original position under the biasing influence of the flexing means 86".

As can be seen, no separate spring is biased against the cassette base in the present invention. Instead, the flexing means 86" merely acts as the spring.

By using the flexing means 86, 86', 86", the present invention eliminates the need for the separate extension arm 28 of the prior art latch 10 which has several significant advantages discussed below.

Less assembly time is required over that of the prior art one-piece latches since the latch of this invention is more easily installed in the cassette base. Most particularly, the latch of the present invention need not be pre-loaded, like the conventional latches including separate spring extensions. For example, no separate projecting spring arm must be accurately biased against a cassette base wall in order to have the latch operate. Further, the latch is not sensitive to precise interior wall location.

The latch of the present invention also has the advantage that it is less vulnerable to storage and shipping damage than prior art devices since it is not installed in a "loaded" condition; there is less chance that the latch will become "unloaded" or dislodged during shipping, handling, etc.

The present invention is also more compact and therefore requires less space than prior art dust door latches. Also, production costs are reduced since the molds are simpler and less materials are used: the separate, projecting, spring arm is eliminated, the latch body is made thinner at the flexing member, and the cassette base interior wall can be eliminated. Further in this regard, if a defect is found in the latch after installation, it can easily be removed, melted down and reused. Overall, product yield is significantly increased.

It can be seen from the above description that the present invention provides an improved integral dust door latch for a video cassette using fewer parts, allowing easier automatic assembly method of the latch in the cassette, and using an assembly method with fewer steps than known in the prior art, thus effecting more time and cost-efficient manufacture and production.

The above-described dust door latches, and methods of assembly therefore, have been shown to be of the type intended for use in video tape players/recorders. However, the invention can be similarly applied to tape cassettes for use in audio or other recording and/or reproducing apparatus.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What we claim is:

1. A tape cassette, comprising:
   (a) a cassette base for rotatably receiving tape reels, wherein the cassette base includes means for receiving lateral supports of a dust door latch;
   (b) a cassette cover to be positioned on the cassette base; and
   (c) a dust door latch received by the base and having
       (1) a planar latch body;
       (2) a pair of lateral supports, each extending from an upper portion of the planar latch body; and
       (3) means, formed integrally of the planar latch body, for allowing one portion of the latch body to flex relative to another portion of the latch body,
       wherein the flexing means includes a first leg extending downward from the first lateral support and a relatively thicker width second leg extending between a curved elbow at a bottom of the first leg and the second lateral support.

2. The tape cassette as recited in claim 1, wherein each lateral support includes an angled free end and wherein the means for receiving the lateral supports includes two receptacles, each receptacle for receiving one of the lateral supports and including a U-shaped opening, and an angled wall corresponding to the angled end of each lateral support.

3. The tape cassette as recited in claim 2, wherein the latch further comprises:
   (a) a first projection used to flex the latch body; and
   (b) a second projection used to removably lock the dust door.

4. The tape cassette as recited in claim 1, wherein the first projection has at least one radiused surface.

5. The tape cassette as recited in claim 1, wherein the latch/spring is injection molded of nylon.

6. The tape cassette as recited in claim 1, wherein the latch is injection molded of acetal.

7. A tape cassette, comprising:
   (a) a cassette base,
       wherein the cassette base includes means for receiving lateral supports of a dust door latch;
   (b) a cassette cover to be positioned on the cassette base;
   (c) a dust door latch received by the base and having
       (1) a planar latch body;
       (2) a pair of lateral supports, each extending from an upper portion of the planar latch body; and
       (3) means, formed integrally of the planar latch body, for allowing one portion of the latch body to flex relative to another portion of the latch body,
       wherein the cassette base includes means for receiving the lateral supports, and
       wherein the flexing means includes a central transverse projection flanked by a plurality of transverse ribs, the central projection abutting an exterior wall of the cassette base when the latch is installed in the cassette base, and the ribs being spaced from the exterior wall.

8. The tape cassette as recited in claim 7, wherein the latch includes cylindrical lateral supports and the means for receiving the lateral supports includes U-shaped recesses.

9. The tape cassette as recited in claim 8, wherein the latch further comprises:

(a) a first projection used to flex the latch body; and
(b) a second projection used to removably lock the dust door.

10. The tape cassette as claimed in claim 9, wherein the first projection has at least one radiused surface.

11. The tape cassette as recited in claim 7, wherein the latch/spring is injected molded of nylon.

12. The tape cassette as recited in claim 7, wherein the latch is injection molded of acetal.

* * * * *